M. SCHULER.
DEVICE FOR DAMPING OSCILLATIONS OF A GYROSCOPE PENDULUM.
APPLICATION FILED MAY 20, 1913.
1,228,061.
Patented May 29, 1917.
3 SHEETS—SHEET 1.
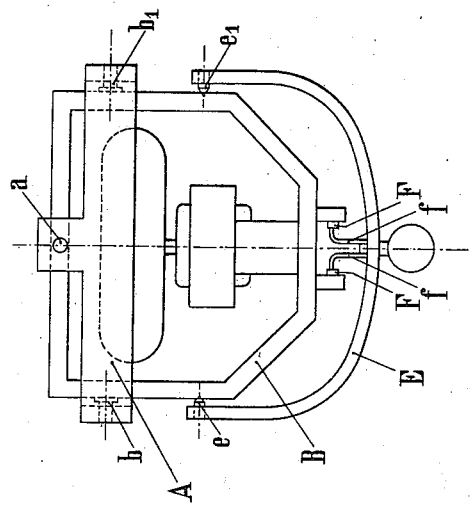
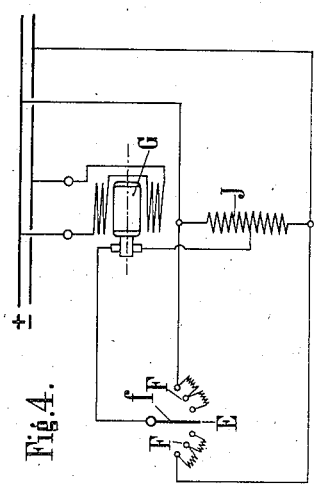
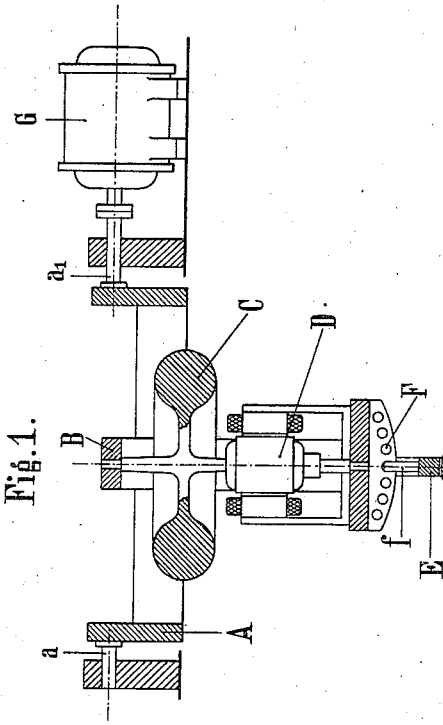
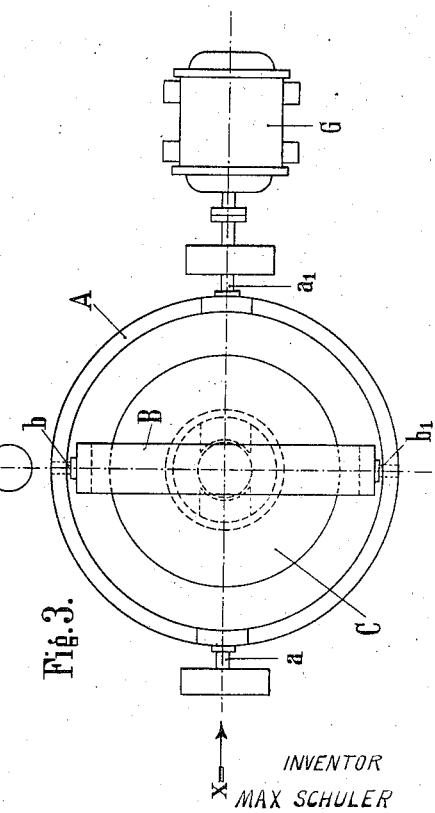
INVENTOR
MAX SCHULER
BY
ATTORNEYS
WITNESSES:
George Du Bon
Louis Alexander M. SCHULER.
DEVICE FOR DAMPING OSCILLATIONS OF A GYROSCOPE PENDULUM.
APPLICATION FILED MAY 20, 1913.
1,228,061.
Patented May 29, 1917.
3 SHEETS—SHEET 2.
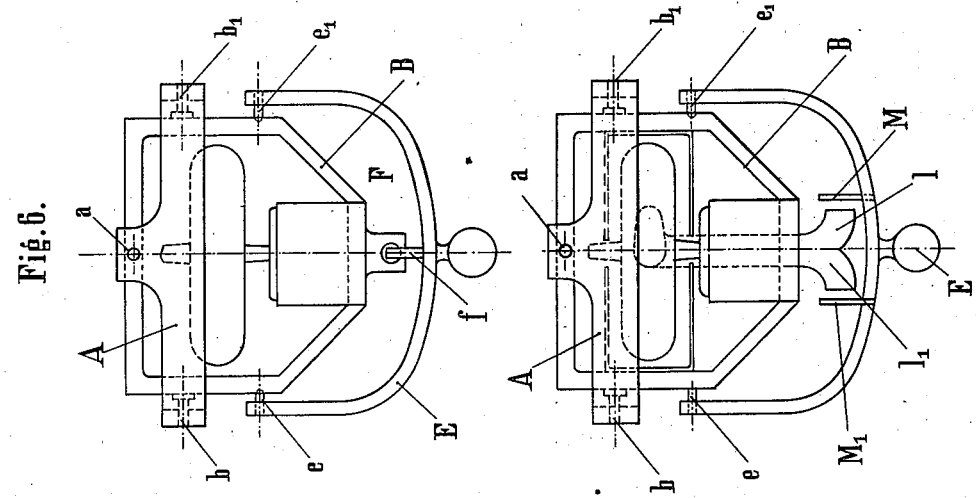
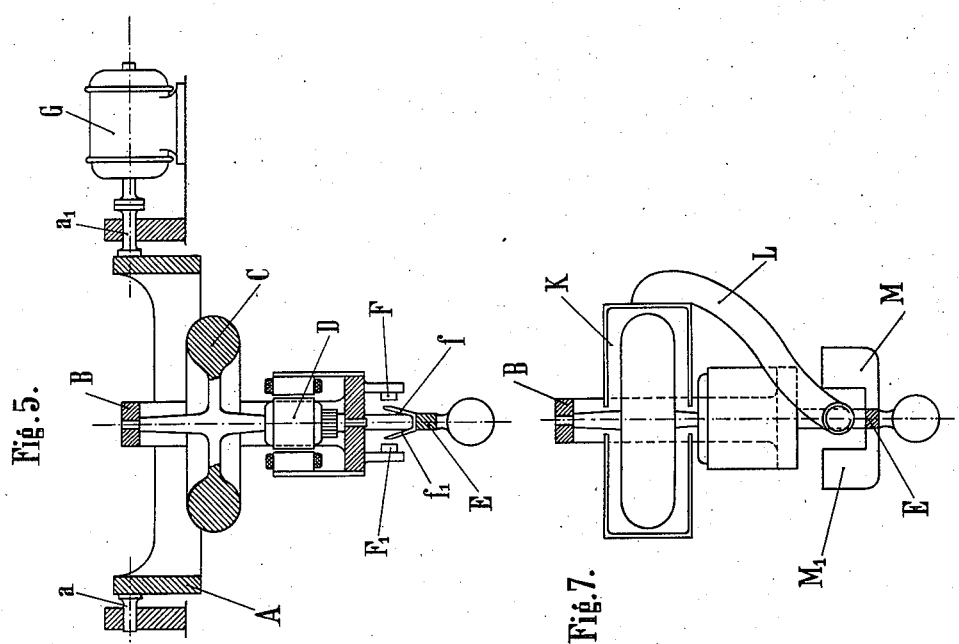
WITNESSES:
INVENTOR
MAX SCHULER
BY
ATTORNEYS M. SCHULER.
DEVICE FOR DAMPING OSCILLATIONS OF A GYROSCOPE PENDULUM.
APPLICATION FILED MAY 20, 1913.
1,228,061.
Patented May 29, 1917.
3 SHEETS—SHEET 3.
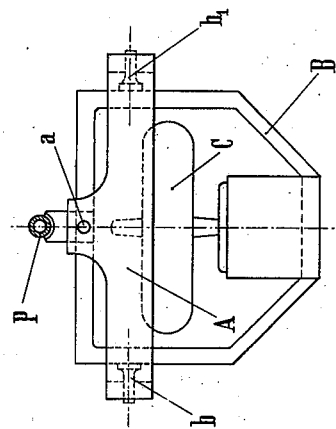
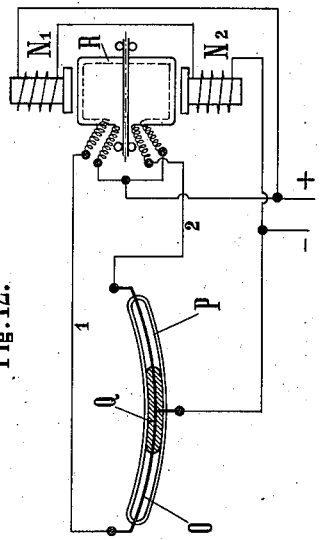
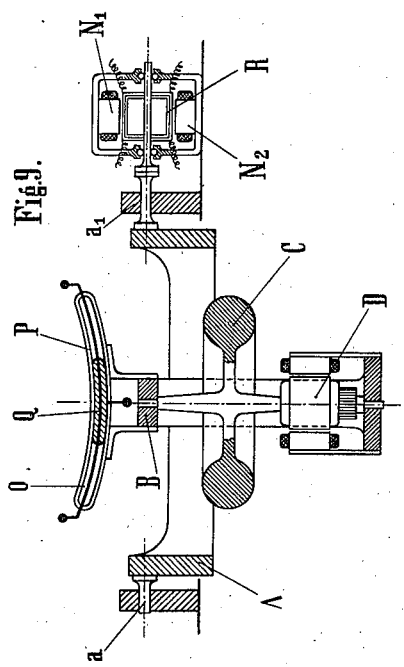
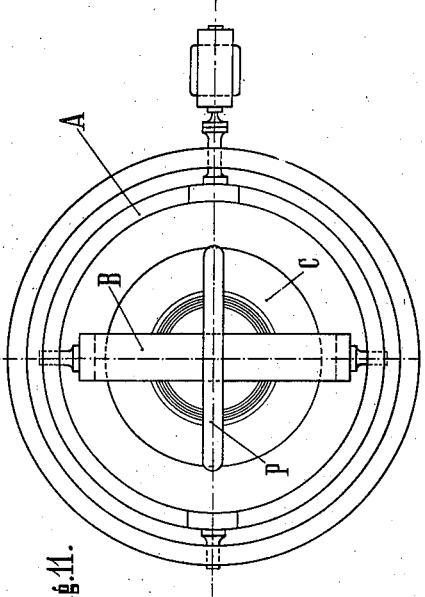
WITNESSES:
INVENTOR
MAX SCHULER
BY
ATTORNEYS

UNITED STATES PATENT OFFICE.

MAX SCHULER, OF NEUMÜHLEN, NEAR KIEL, GERMANY, ASSIGNOR TO ANSCHÜTZ & CO., OF NEUMÜHLEN, NEAR KIEL, GERMANY.

DEVICE FOR DAMPING OSCILLATIONS OF A GYROSCOPE-PENDULUM.

1,228,061.

Specification of Letters Patent. Patented May 29, 1917.

Application filed May 20, 1913. Serial No. 768,739.

*To all whom it may concern:*

Be it known that I, MAX SCHULER, a subject of the Emperor of Germany, residing at Heikendorfer Weg 9, Neumühlen, near Kiel, Germany, have invented certain new and useful Improvements in Devices for Damping Oscillations of a Gyroscope-Pendulum, of which the following is a specification.

It is frequently important to measure on moving bodies, more particularly on ships, the angle which they make at any moment with the vertical. The simple pendulum is not suitable for the purpose, as it is caused to oscillate by the accelerations produced. The greater the natural period of oscillation of the pendulum, the more steady it will remain. The ideal case is that in which all the accelerations approximately neutralize each other during one single oscillation of the pendulum. The required long time of oscillation of the pendulum is preferably obtained by incorporating with it one or more gyroscopes. Such arrangements are already well known and they are hereinafter referred to as "gyroscope pendulum."

The essential feature of a gyroscope pendulum consists in the combination a pendulum which can oscillate in one plane with a gyroscope, the axis of which in the normal position is vertical, but at the same time can oscillate at a right angle to the plane of oscillation of the pendulum.

This invention has for its object to damp the oscillations of such a gyroscope pendulum, without at the same time increasing thereby the friction of the suspension of the pendulum. An increased friction at that point would exercise reactions on the pendulum during the movements of the support. According to this invention, for the purpose of damping the gyroscope pendulum, is used an outside force, the action of which is regulated by the oscillations of the gyroscope normally to the plane of the pendulum.

A construction according to this invention is illustrated in the accompanying drawing, in which—

Figure 1 shows a gyroscope pendulum in cross-section on line $x$ of Fig. 3.

Fig. 2 is a side elevation of the same,

Fig. 3 a plan, while

Fig. 4 shows diagrammatically the path of the current.

Fig. 5 is a central sectional elevation, taken from the front, of a modified form of my gyroscope pendulum; Fig. 6 is a side elevation of the same; Fig. 7 is a front elevation, part section, of still another form of my pendulum and Fig. 8 the side elevation thereof; Fig. 9 is a central sectional elevation of a fourth form of my pendulum; Fig. 10 a side elevation; Fig. 11 a plan and Fig. 12 a diagrammatic representation of the path of the current.

About pins $a$ $a'$ is rotatably mounted the ring A which in its turn rotatably supports the frame B in pins $b$ $b'$ (Fig. 2). To the said frame B are rigidly secured the bearings of the gyroscope C driven by the electric motor D. As the center of gravity of all the parts is situated under the connection line $a$ $a'$, the parts A B C D represent a gyroscope pendulum of the above mentioned kind. The frame B supports further, by means of pins $e$ $e'$, a bracket E with a weight which will be designated as auxiliary pendulum, as it can oscillate like an ordinary pendulum about the pins $e$ $e'$. Moreover, at the lower end of the frame B are arranged contact studs F, on which slide two contact springs $f$ secured to the auxiliary pendulum E. When the pendulum E oscillates, it sends into the motor G a current, the strength and direction of which differs according to the size and direction of the relative movement of the two pendulums. The motor G exercises a turning moment or torque about the pins $a$ $a'$, the direction of which is calculated in such a manner that the precessional movement of the gyroscope, thus produced, brings its axis back into the vertical position. As the plane of oscillation of the auxiliary pendulum is normal to that of the gyroscope pendulum, the auxiliary pendulum will not be influenced by the oscillations of the gyroscope pendulum. It is true that, owing to the oscillations of the ship's body taking place normally to the plane of oscillation of the gyroscope pendulum, there will be produced acceleration pressures in its bearings and therefore it can oscillate normally to the plane of the gyroscope pendulum, but as these oscillations take place very quickly, their action on the gyroscope pendulum is again neutralized. The oscillation of the gyroscope can therefore be measured by means of the auxiliary pendulum E.

As will be seen in Fig. 4, the connection is made so that one brush of the motor G is connected to the neutral point of a resistance J permanently inserted between the outer conductors, and the other brush to the springs $f$. The contacts F of one side are connected to the positive pole and those of the other side to the negative pole. The field winding of the motor G is energized directly from the conductor.

The essential feature of the invention consists in applying a turning moment to the pins of the gyroscope pendulum, which is controlled by the angle of oscillation of the vertical gyroscope axis about an axis in the plane normal to the plane of the pins. The construction described and shown in Figs. 1–4 merely shows one construction according to the invention. The auxiliary pendulum may, within the limits of the invention, close but a single contact at each side, as is shown in Figs. 5 and 6. The pendulum E has two springs $f$ and $f'$ which touch either one of the contacts F and F' according to the oscillation of the gyroscope about the pins $b$, $b'$ in one direction or the other. Current is thus sent to the armature of the motor G as above described and a turning moment is developed in one or the other direction according to which contact is made. The motor current may be controlled by relays instead of directly by the pendulum.

Figs. 7 and 8 show another form embodying the inventive idea. Here the turning moment is not produced by magnetic forces but by the reaction of air jets. The gyroscope is formed as a centrifugal air machine which is inclosed in the casing K having axial air-openings. The radially arranged pipe L carries the air downward and has two nozzles $l$, $l'$. Normally, the air jets from the nozzles $l$, $l'$, produce equal but opposite reactions. The pendulum E, rotatable about the pins $e$, $e'$, is provided with two closing members $m$, $m'$. If the pendulum oscillates to the right (Fig. 7) the member $m$ closes the nozzle $l$, the air flows through the nozzle $l'$ and only a reaction pressure arises, which produces a turning moment about the pins $a$, $a'$. If the oscillation of the pendulum is in the opposite direction the member $m'$ closes the nozzle $l'$, the air leaves through the nozzle $l$, and the turning moment about the pins $a$, $a'$ is in the opposite direction.

The auxiliary pendulum in this construction is also rotatable about pins which are arranged parallel to the pins $b$, $b'$ through which passes the axis of the gyroscope pendulum, while the turning moment governed by the auxiliary pendulum takes place about the pins $a$, $a'$, arranged in a plane at right angles to the axis through the pins $b$, $b'$ and $e$, $e'$.

The purpose of the auxiliary pendulum E, in the constructions above described, is to keep the perpendicular line of the gyroscope as steady as possible with respect to the pins $b$, $b'$. The auxiliary pendulum can be done away with, if there are no noticeable oscillations about said pins $b$, $b'$ in which case the closing members may be fastened to some convenient part of the main pendulum. It is only necessary in this construction that the pendulum E remains in an approximate perpendicular line.

Still another form embodying the inventive idea is shown in Figs. 9 to 12; Fig. 12 shows, diagrammatically, the system of connections for this arrangement. The gyroscope pendulum is, as in the former construction, rotatably mounted about the pins $a$, $a'$ and $b$, $b'$. Instead of the auxiliary pendulum, a mercury level P is used having a mercury column Q. A resistance wire O is fused into the level. Instead of a motor, an induction coil R is used on the pin $a'$, which is rotatably mounted between the magnets N, N'. According to the direction of the current in the coil, turning moments are exerted on the pin $a'$ in one or the other direction. The induction coil has two windings in opposite directions, which are connected with the mercury level according to the connections of Fig. 12.

The operation of this construction is as follows: When the mercury column is in the middle, the resistance of the two current paths 1 and 2 (Fig. 12) is the same and the turning moment of the two coil windings is equalized. As soon as the gyroscope pendulum oscillates about the pins $b$, $b'$ the mercury column Q is shifted thus increasing the length of wire on one side and decreasing the length on the other side so as to produce an inequality of current in the two current paths 1 and 2. According to the direction of the oscillation of the gyroscope pendulum about $b$, $b'$, a turning moment is produced by the induction coil about the pins $a$, $a'$, in one or the other direction. When the connections are rightly made the turning moment will restore the vertical position of the gyroscope axis.

It follows from the constructions that, owing to the present arrangement, the vertical tilt is measured only in one plane. If it is desired to measure deviations from the vertical line in a plane at an angle of 90°, to the first plane, it is necessary to use a second similar device arranged at an angle of 90° to the first.

The arrangement described makes it possible to take off at the pins $a$ $a'$ a certain amount of work which can be utilized for instance for operating regulating parts without materially disturbing the position of rest of the main pendulum. For as soon as, owing to the work, the gyroscope makes an oscillation, the auxiliary pendulum E switches in an external turning moment which supplies the main portion of the work taken off, that is to say, it relieves the pendulum of that work. In such a case the gyroscope pendulum can be made into a comparatively small apparatus, while for instance a motor controlled by the same can have large power. In such a case the present invention becomes a governor which controls a motor and equalizes for the greatest part the irregularities of the movement of the motor by its stability momentum. Such an arrangement would also be covered by the invention.

What I claim is:—

1. In combination, a main pendulum including a gyroscope said pendulum being adapted to oscillate about a horizontal axis while the gyroscope is adapted to oscillate about a second horizontal axis at right angles to the first named axis, a fixed support for the axis of the main pendulum, means entirely independent of the main pendulum and fixedly related to said fixed support for applying a turning moment to said main pendulum, and means whereby oscillations of said gyroscope control said turning moment applying means so as to counteract oscillations of said pendulum.

2. In combination, a main pendulum including a gyroscope said pendulum having a fixedly attached horizontal axis, and the gyroscope being adapted to oscillate about a second horizontal axis at right angles to the first named axis, a fixed support for the axis of the main pendulum, a motor fixedly related to said fixed support and engaging the aforesaid axis of the main pendulum, means whereby oscillations of the gyroscope control the action of the motor so as to cause turning moments to be applied to the main pendulum axis, whereby oscillations of said main pendulum are counteracted.

3. In a gyroscope pendulum, in combination a gyroscope having a normally vertical axis, means for pivoting said gyroscope universally about a point situated above its center of gravity, external means for applying a turning moment to said gyroscope about a horizontal axis, and a pendulum pivoted about a horizontal axis at right-angles to the first, and adapted to cause the said external means to apply turning moments to the gyroscope to counteract the oscillations thereof.

4. In a gyroscope pendulum, the combination with a gyroscope having a normally vertical axis, means for pivoting said gyroscope universally about a point situated above its center of gravity, an electric motor for applying a turning moment to said gyroscope about a horizontal axis, and a pendulum pivoted about a horizontal axis at right-angles to the first, electric contacts arranged in the circuit of said motor and adapted to be contacted by said pendulum during its oscillations, whereby the motor circuit is closed and the motor exerts a turning moment on said gyroscope to counteract the oscillations thereof.

In witness whereof I have hereunto signed my name this 3rd day of May, 1913.

MAX SCHULER.